(12) United States Patent
Weinberger et al.

(10) Patent No.: US 8,606,617 B2
(45) Date of Patent: Dec. 10, 2013

(54) METHOD FOR COMPUTING REACH OF AN ARBITRARY RADIO ADVERTISING SCHEDULE

(75) Inventors: Arthur Weinberger, Sunnyvale, CA (US); Marwan Shaban, Saint Cloud, FL (US)

(73) Assignee: Clear Channel Management Services, Inc., San Antonio, TX (US)

(*) Notice: Subject to any disclaimer, the term of this patent is extended or adjusted under 35 U.S.C. 154(b) by 899 days.

(21) Appl. No.: 12/687,355

(22) Filed: Jan. 14, 2010

(65) Prior Publication Data

US 2011/0173048 A1    Jul. 14, 2011

(51) Int. Cl.
*G06Q 10/00*    (2012.01)
*G06Q 30/00*    (2012.01)
*H04H 60/33*    (2008.01)

(52) U.S. Cl.
USPC ........... 705/7.29; 705/14.4; 455/2.01; 725/10

(58) Field of Classification Search
USPC .................. 705/7.29, 14.4; 455/2.01; 725/10
See application file for complete search history.

(56) References Cited

U.S. PATENT DOCUMENTS

| | | | |
|---|---|---|---|
| 6,587,127 B1* | 7/2003 | Leeke et al. | 715/765 |
| 2002/0188746 A1* | 12/2002 | Drosset et al. | 709/231 |
| 2003/0101449 A1* | 5/2003 | Bentolila et al. | 725/10 |
| 2007/0107008 A1* | 5/2007 | Dybus | 725/9 |
| 2009/0254420 A1* | 10/2009 | Curd et al. | 705/10 |

OTHER PUBLICATIONS

Rogers, Robert P; Woodbury, John R, Market structure, program diversity, and radio audience size. Contemporary Economic Policy; Jan. 1996; 14, 1; ProQuest Central. pp. 81-91.*
Arbitron—New Age for Radio—Electronic Audience Measurement With the PPM System. published Jul. 4, 2007. Retrieved from http://web.archive.org/web/20070704005228/http://www.arbitron.com/portable_people_meters/home.htm. 3 pgs.*
OnRadio Joins Arbitron NewMedia's Streaming Media Alliance; Arbitron to Provide Third-Party Measurement to Largest Internet Radio Network. Business Editors. Business Wire [New York] Feb. 4, 1999: 1.*
Arbitron, Inc; "Turning the Numbers into Sales Solutions", Arbitron brochure, 2001, United States.
Arbitron, Inc; "Terms for the Trade", Arbitron brochure, 2002, United States.
Leckenby, John; "Exposure Distribution Models: Some Estimation Methods in Application", American Academy of Advertising Convention, Apr. 1981, United States.
Kishi, Shizue; "A Test of the Direct/Indirect BBD and Other Exposure Models", American Academy of Advertising Convention, Mar. 1982, United States.

(Continued)

*Primary Examiner* — Lynda Jasmin
*Assistant Examiner* — Timothy Padot
(74) *Attorney, Agent, or Firm* — Garlick & Markison; Edward J. Marshall

(57) ABSTRACT

A radio station market analysis program extends Cume values for individual stations to multiple stations (for a particular geographic market, a particular demographic, and a particular daypart) according to the formula $C=[1-\Pi_{i=1,n}(1-(C_i/P))]*P$, where n is the number of media stations, P is the population, and $C_i$ is each Cume value. Cume values may be provided for a limited set of input dayparts from Arbitron and Nielson, and are translated to an arbitrary daypart. The arbitrary daypart can represent a sum of component dayparts in a proposed advertising schedule. The reach of the proposed advertising schedule can be further computed based on a hyperbolic function of spot count.

21 Claims, 5 Drawing Sheets

(56) References Cited

OTHER PUBLICATIONS

Rice, Marshall; "Predicting Within-Vehicle Television Duplication", American Academy of Advertising Convention, 1984, United States.
Kishi, Shizue; "Error Factors in Exposure Distribution Models", American Academy of Advertising Convention, 1981, United States.
Kim, Hyo-Gyoo; "Internet Reach/Frequency Estimation Accuracy by Data Collection Method", American Academy of Advertising Convention, 2001, United States.
Kim, Hyo-Gyoo; "How Media Directors View Traditional and Interactive Media Planning", American Academy of Advertising Convention, 2001, United States.
Hardie, Bruce; "Applied Probability Models in Marketing Research", 11th Annual Advanced Research Techniques Forum, Jun. 2000, United States.
Leckenby, John; "Advances in Media Decision Models", 1989, United States.
Abe, Makoto; "Audience Accumulation by Television Daypart Allocation Based on Household-Level Viewing Data", Journal of Advertising, 1996, United States.
Leckenby, John; "An Improved Beta Binomial Reach/Frequency Model for Magazines", Current Issues & Research in Advertising, 1984, United States.
Boyd, Marsha; "Random Duplication in Reach/Frequency Estimation", Journal of Current Issues and Research in Advertising, 1985, United States.
Rice, Marshall; "Estimating the Exposure Distribution of Magazine Schedules in Limited Data Situations", American Academy of Advertising Convention, 1985, United States.
Leckenby, John; "A Large-Scale Test of the Declining Reach Phenomenon in Exposure Distribution Models", American Academy of Advertising Convention, 1987, United States.
Ju, Kuen-Hee; "Performance of a Simple Reach/Frequency Model", American Academy of Advertising Convention, 1990, United States.
Leckenby, John; "Unresolved Issues in Media Reach/Frequency Models", American Academy of Advertising Convention, 1992, United States.
Kim, Heejn; "A Test of the Canonical Expansion Reach/Frequency Model", American Academy of Advertising Convention, 1993, United States.
Kim, Heejn; "A Modified Dirichlet Model for Advertising Media Schedules", American Academy of Advertising Convention, 1994, United States.
Ju-Pak, Kuen-Hee; "Between Schedule Comparison in Advertising Media Reach/Frequency Models", American Academy of Advertising Convention, 1995, United States.
Cannon, Hugh; "Overcoming the Media Planning Paradox: From Ineffective to Optimal Reach and Frequency", American Academy of Advertising Convention, 1996, United States.
Hong, Jonpil; "Audience Measurement and Media Reach/Frequency Issues in Internet Advertising", American Academy of Advertising Convention, 1997, United States.
Hong, Jonpil; "Reach/Frequency Estimation for the World Wide Web", American Academy of Advertising Convention, 1997, United States.
Hong, Jonpil; "Audience Duplication Issues in World Wide Web Reach/Frequency Estimation", American Academy of Advertising Convention, 1998, United States.
Leckenby, John; "Performance of Four Exposure Distribution Models", Journal of Advertising Research, Apr./May 1982, United States.
Leckenby, John; "How Media Directors View Reach/Frequency Estimation", Journal of Advertising Research, Jun./Jul. 1982, United States.
Leckenby, John; "How Media Directors View Reach/Frequency Model Evaluation Standards", Journal of Advertising Research, Oct./Nov. 1984, United States.
Leckenby, John; "The Dirichlet Multinominal Distribution as a Magazine Exposure Model", Journal of Marketing Research, 1984, United States.
Leckenby, John; "A Beta Binomial Network Exposure Model Using Limited Data", Journal of Advertising, 1985, United States.
Leckenby, John; "The Declining Reach Phenomenon in Exposure Distribution Models", Journal of Advertising, May 1986, United States.
Rice, Marshall; "An Empirical Test of a Proprietary Television Media Model", Journal of Advertising Research, 1986, United States.
Leckenby, John; "How Media Directors View Reach/Frequency Estimation: Now and a Decade Ago", Journal of Advertising Research, Sep./Oct. 1994, United States.
Leckenby, John; "Using Reach/Frequency for Web Media Planning", Journal of Advertising Research, Jan./Feb. 1998, United States.
Lee, Suckkee; "Impact of Measurement Periods on Website Rankings and Traffic Estimation: A User-Centric Approach", Journal of Current Issues and Research in Advertising, Fall 1999, United States.

\* cited by examiner

METHOD FOR COMPUTING REACH OF AN ARBITRARY RADIO ADVERTISING SCHEDULE

BACKGROUND OF THE INVENTION

1. Field of the Invention

The present invention generally relates to audience statistics, and more specifically to methods and systems for computing statistics relating to station audiences, particularly terrestrial radio stations.

2. Description of the Related Art

Radio ratings are very important to many different divisions of a radio station company, including radio station executives, advertising and marketing departments, and program directors. Radio station executives use ratings statistics to help them evaluate the health of the company's radio stations, as well as monitoring competitors and industry-wide trends. Advertisers and marketers depend on ratings to measure the effectiveness of their advertising/marketing strategies and adapt to changing market environments and fads. It is a program director's responsibility to not only have an intimate understanding of how ratings are compiled and calculated, but also how to utilize these ratings in an effort to adapt and innovate software solutions for varying market circumstances and business needs.

There are several standard types of statistics (ratings data) for researching radio stations, including AQH (or AQHP), Cume, and primary demographic. AQH stands for Average Quarter Hour (AQHP is Average Quarter Hour Persons), and refers to the average number of people listening to a radio station for at least five minutes in any quarter hour of a radio station's schedule. The number of people listening to an entire hour is not necessarily the sum of four quarter hours because of duplication. However, some people may listen for more than a single quarter hour. Cume is the total number of different (unique) persons that listen to a radio station within a given daypart. A daypart is a set of times throughout a given week. For example, a daypart could be every weekday (Monday through Friday) from 6:00 am until 10:00 am. If the daypart is 15 minutes there is no difference between AQH and Cume. Primary demographic refers to various categories of consumers (listeners of a given radio station) such as gender or age.

Arbitron, Inc., is an organization which collects raw radio listener data and generates statistical information similar to the standard statistics mentioned above. It is a media and marketing research firm which primarily serves media companies and advertisers/advertising agencies who carry out ratings analysis based on the statistics. Arbitron selects random samples of the population throughout various metro areas in the United States, and participants keep a diary of their actual listening times. Respondent-level data (RLD) is the raw data collected by Arbitron, while the summary data set (SDS) is the various statistics calculated by Arbitron, which is derived from the respondent-level data and has only specifically-selected dayparts (40 dayparts total).

Tapscan is a local market radio ratings software suite developed by Arbitron, which is used by media planners (e.g., ad agencies) to decide where to place their clients' radio commercials. Some of the specific features of Tapscan include ranking radio stations based on their broadcast hours, day, audiences, etc., using audience composition data (consumer demographics) to determine which radio stations are listened to by what people, presenting cost and radio station data in different ways, providing access to customized demographics, geographies, dayparts and multibook averages, and determining a radio station's reach and frequency by specific demographic, daypart, and spot level. Tapscan uses RLD and SDS, and other data sets such as Arbitron's Black Radio Data, Hispanic Radio Data, and Eastlan Radio Data.

Although Tapscan and other radio station ratings programs can provide a reach value for a radio station, the reach provided is calculated based on interpretation of listener statistics. Those interested in radio station research might find a different source of reach useful, as well as other statistics which are related to reach. The values of such statistics as AQH and Cume provided by Arbitron are calculated using a limited set of dayparts, which means that these values would be different if an alternative set of dayparts was defined.

It would, therefore, be desirable to devise an improved method of calculating ratings data for radio stations. It would be further advantageous if the method could effectively approximate different ratings statistics from previously collected data for arbitrary user-specified schedules.

SUMMARY OF THE INVENTION

The foregoing objects are achieved in a method of extending Cume values for individual media stations to multiple media stations, by receiving a population value and Cume values for each of the individual media stations based on given ratings parameters, identifying a set of multiple media stations including two or more of the individual media stations, and computing a Cume value C for the set of multiple media stations according to the formula $$C = [1 - \Pi_{i=1,n}(1-(C_i/P))]*P$$

where n is the number of media stations in the set, P is the population value, and $C_i$ is each Cume value for an individual media station i in the set, by executing program instructions in a computer system. The ratings parameters may include a particular geographic market, a particular demographic, and a particular daypart, and the population value may be the population of the particular demographic over the particular geographic market. The Cume values for each of the individual media stations may be provided for a limited set of input dayparts (for example from Arbitron or Nielson), and the Cume values can be translated to an arbitrary daypart different from the input dayparts by identifying a smallest one of the input dayparts that encompasses the arbitrary daypart (the minimal parent), creating a list of Cume values which include first Cume values for maximal input dayparts encompassed by the arbitrary daypart and second Cume values for intersections of the arbitrary daypart and selected input dayparts, and computing a desired Cume value for the arbitrary daypart according to a similar formula but substituting the Cume value of the minimal parent for the population P. The method can operate on first Cume values from a first vendor for a first set of dayparts to provide a first output, and operate on second Cume values from a second vendor for a second set of dayparts different from the first set to provide a second output. The arbitrary daypart can represent a sum of component dayparts in a proposed advertising schedule. The reach of the proposed advertising schedule can be further computed based on an inverse exponential function of spot count.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
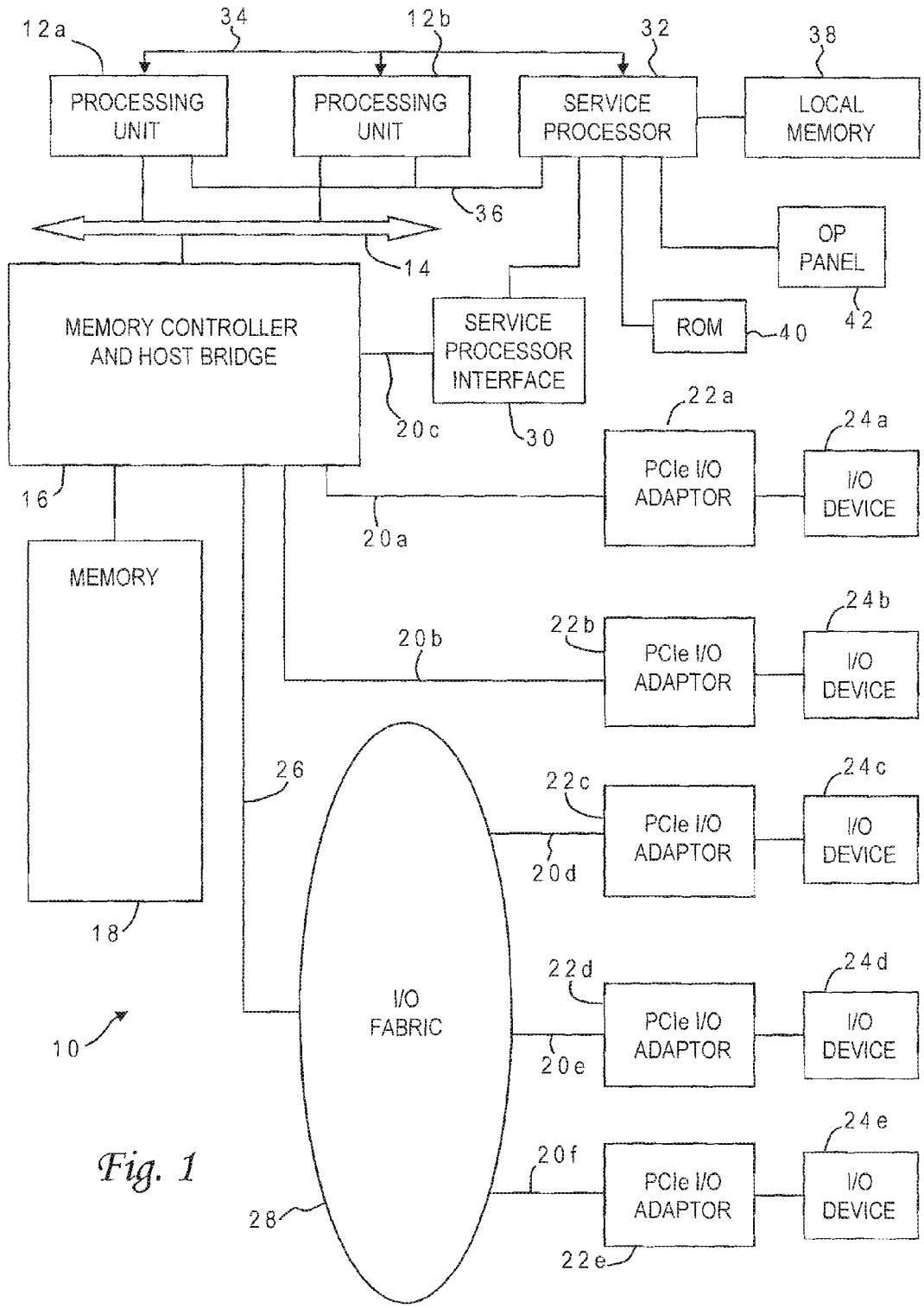
FIG. 1 is a block diagram of a computer system programmed to carry out radio station ratings analysis in accordance with one implementation of the present invention.

With reference now to the figures, and in particular with reference to FIG. 1, there is depicted one embodiment 10 of a computer system in which the present invention may be implemented to carry out radio station ratings analysis. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the radio station statistical application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

While the illustrative implementation provides program instructions embodying the present invention on a disk drive of computer system 10, those skilled in the art will appreciate that the invention can be embodied in a program product utilizing other computer-readable storage media. The program instructions may be written in the C++ programming language for a Windows 7 environment or in other programming languages suitable for other operating system platforms. Computer system 10 carries out program instructions for a radio station ratings analysis process that uses novel computational techniques to manage statistical data. Accordingly, a program embodying the invention may include conventional aspects of various statistical tools, and these details will become apparent to those skilled in the art upon reference to this disclosure.

Figure 2:
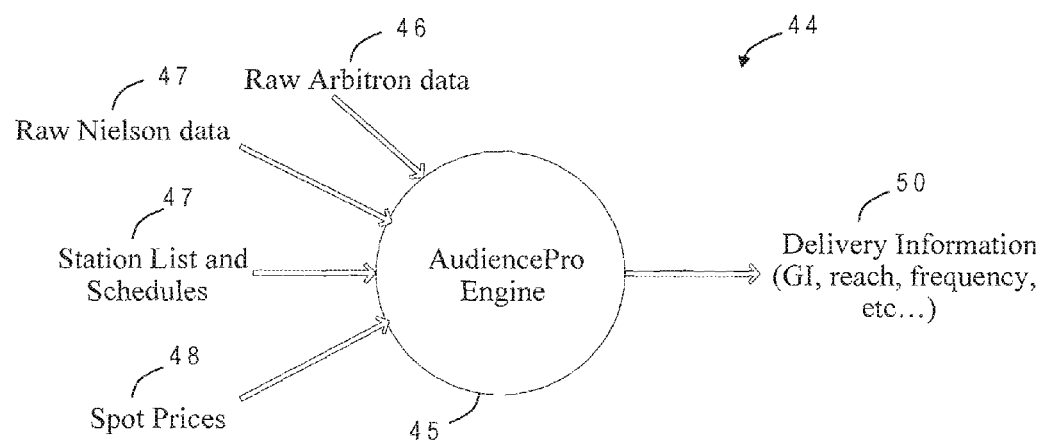
FIG. 2 is a pictorial representation of a system used in accordance with one embodiment of the present invention for computing radio station marketing statistics.

FIG. 2 is a pictorial representation of a station marketing analysis system 44 used in accordance with one embodiment of the present invention for computing radio station marketing statistics. Station marketing analysis system 44 employs an engine 45 denoted "AudiencePro" which may be implemented through execution of program instructions on computer system 10. AudiencePro engine 45 can collect various types of information, including (but not limited to) raw Arbitron data 46, raw Nielson data 47, station list and schedules 48, and spot prices 49. Raw Arbitron data 46 includes data such as AQH, Cume, and market populations, for a limited set of summary dayparts (input/Arbitron dayparts). For example, Arbitron provides AQH values for the dayparts Monday-Friday 5-6 a.m., Monday-Friday 6-7 a.m., . . . , Monday-Friday midnight-1 a.m., and larger granularities such as Monday-Friday 1-5 a.m. The same dayparts are provided for Saturday and Sunday, individually. One daypart is even Monday-Sunday 6 a.m.-6 a.m. (the entire week). Raw Nielson data 47 is similar to raw Arbitron data 46 but is provided for a different set of dayparts. Station list and schedules 48 provides AudiencePro engine 45 with a list of stations and various advertising schedules including arbitrary (user-defined) sets of dayparts as desired by the client for a particular marketing campaign. Radio stations sell their airtime according to dayparts. A simple daypart lineup might be: 6 am-10 am, 10 am-3 pm, 3 pm-7 pm, and 7 pm-midnight. AudiencePro engine 45 can also receive information regarding spot prices 49 from the client or other sources such as a yield management system which automates pricing. A spot price is the current price at which a particular commodity (in this example, radio advertising time) can be bought or sold. These information sources can be in operative communication with AudiencePro engine 45 by a variety of means, such as public or private wired or wireless (radio or cellular) networks including the Internet, satellite, public switched telephone network (PSTN), or any combination of the foregoing, including some form of direct wiring. When AudiencePro engine 45 is deployed in a client environment, it can download all Arbitron or Nielson data needed for an extended period of time and cache it on the client machine (computer system 10).

After processing inputs from the information sources, AudiencePro engine 45 produces delivery information 50 which can include a wide variety of ratings-related statistics. Delivery information can be provided in a variety of forms to any output device (i.e., I/O device 24) of computer system 10, such as a display device or printer. In a preferred embodiment delivery information 50 includes:

Gross Impressions ("GI," the sum of individual AQH numbers, rolled up across stations and dayparts);
CPM (Cost Per Thousand=price/GI*1000);
GRP (Gross Rating Points=GI/population*100);
CPP (Cost Per Point=price/GRP);
Reach (can be derived in conjunction with FIG. 6 below);
% Market Reach (Reach*100/population);
Frequency (GI/Reach);
CPMNR (CPM Net Reach=price/Reach*1000);
AQH (for the daypart in question, does not depend on spot count);
AQH Rating (AQH/population*100);
Cume (for the daypart in question, does not depend on spot count);
Cume Rating (Cume/population*100).

AudiencePro engine 45 can maintain this output data and more (including input data and intermediate data) in multidimensional arrays or matrices with different variables indexed as appropriate, such as by book, market, demographic, station, Arbitron daypart, or client daypart.

As explained further below, in order to produce these outputs AudiencePro engine 45 executes several calculations including computing the Cume of an arbitrary daypart from the Cume of a limited set of dayparts, and computing a Cume for multiple stations from Cume values of individual stations.

The outputs of AudiencePro engine 45 are accordingly dependent on various user inputs, such as the list of stations, demographic, flight dates and schedule for each desired station (including specific dayparts, spot counts, and any weighting adjustments).

Figure 3:
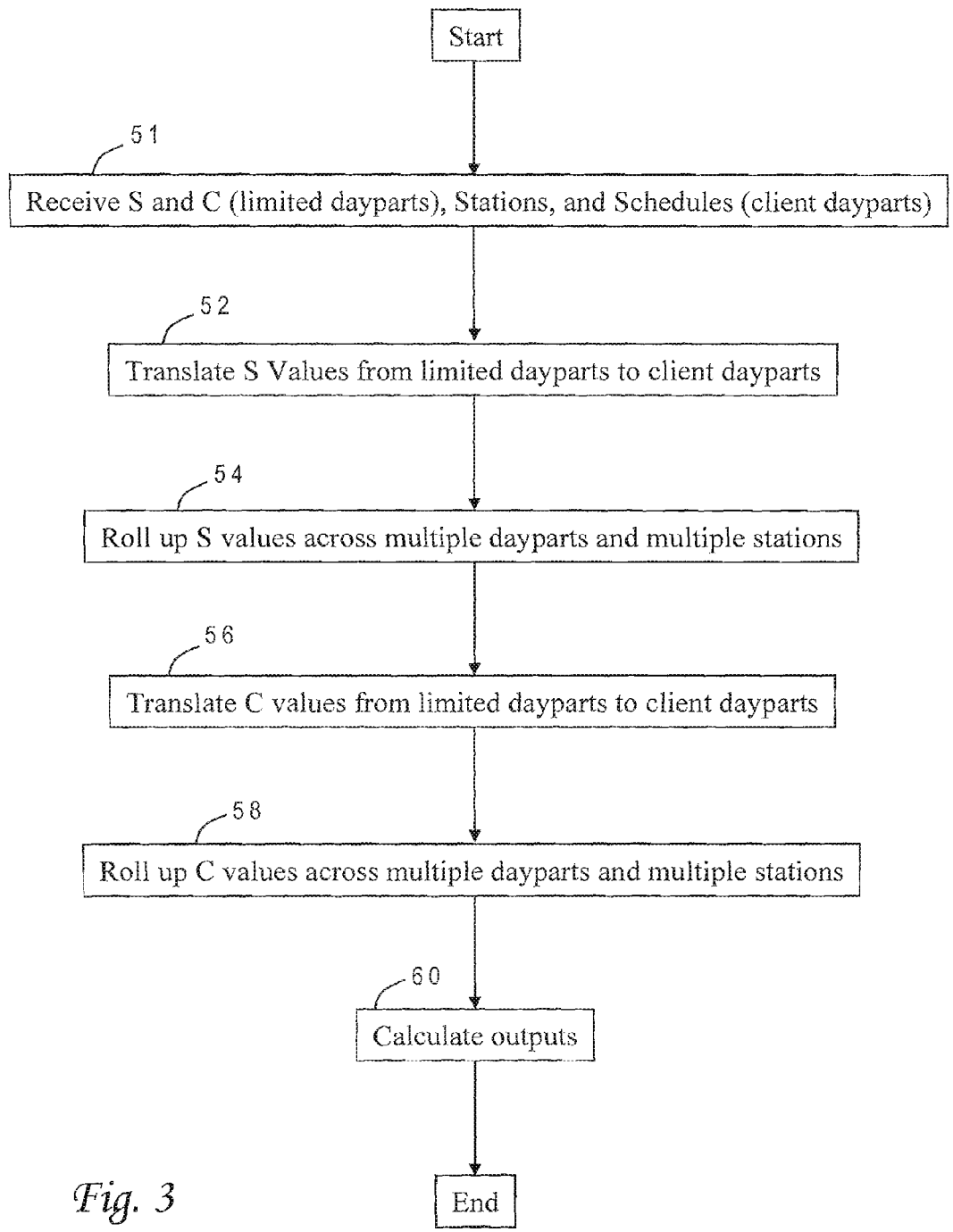
FIG. 3 is a chart illustrating the logical flow for a process of translating and rolling up average quarter hour (AQH) and Cume values to calculate various outputs for radio station ratings analysis in accordance with one implementation of the present invention.

FIG. 3 is a flow chart for a process of translating and rolling up AQH and Cume values to calculate the various outputs of AudiencePro engine 45 and particularly Reach, in accordance with one implementation of the present invention. In FIG. 3 and the figures that follow, AQH is represented by the letter "S", and Cume is represented by the letter "C". The radio station ratings analysis process begins when computer system 10 receives information from the various sources, particularly S and C of all available stations for limited (Arbitron or Nielson) dayparts, a station list, and a proposed schedule including client (AudiencePro) dayparts (51). The radio station ratings application of the present invention can consolidate the data streams from multiple vendors such as Arbitron and Nielson to present a single interface to the user. In this manner the system can switch between sets of input data to provide output based on a selected vendor. The input S values for each client station are then translated from the limited dayparts to the client dayparts (52). If the client daypart is contained in an input daypart, then the S value from that input daypart will simply be used for the translation. If instead the client daypart is not contained in an input daypart, then the smallest set of input dayparts that contain the client daypart will be used for the translation. In this case, the S value for the client daypart is the weighted average of S values for the input dayparts in this set. The average is weighted by the portion of the client daypart contained in each input daypart used. After S values are translated, they can be extended (rolled up) across multiple (client) dayparts and multiple stations (54). To roll up the S values, gross impressions (GI) are added up across order lines which can span multiple dayparts and multiple stations. Then, the rolled up S for the schedule (which can span multiple dayparts and stations) is the total GI divided by the number of spots.

Once these intermediate AQH computations are complete, similar computations are performed for Cume. The input C values for each client station are translated from the limited dayparts to the client dayparts (56). A preferred computation for this C translation is discussed further below in conjunction with FIG. 4. After C values are translated, they can be rolled up across multiple (client) dayparts and multiple stations (58). Rolling up C values across dayparts is accomplished used the same algorithm for C value translation; the input daypart for the algorithm is given as the sum of dayparts in the proposed schedule. A preferred computation for rolling up C values across stations is discussed further below in conjunction with FIG. 5. Delivery information 50 is then computed according the formulas given above (60), and the process is complete. The translation and rolling up of S and C values can introduce inaccuracies to varying degrees but the resulting outputs are still considered excellent approximations for marketing and research purposes.

Figure 4:
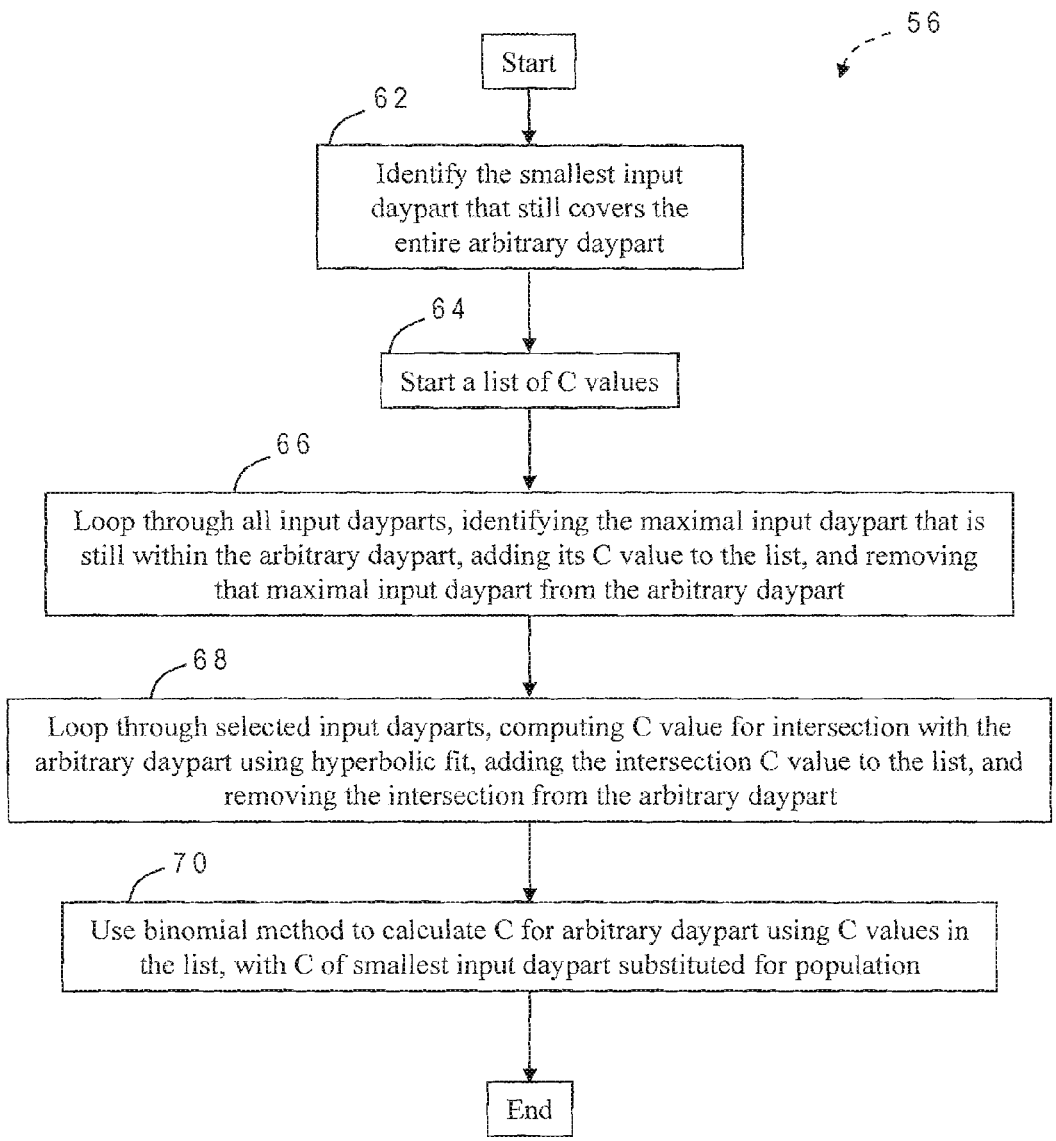
FIG. 4 is a chart illustrating the logical flow for a process of computing Cume values for arbitrary dayparts in accordance with one implementation of the present invention.

In some embodiments the translation of C values from a limited set of dayparts to an arbitrary daypart (56) is accomplished by the process illustrated in the flow chart of FIG. 4. This process begins when computer system 10 identifies the smallest input daypart which still covers an entire (user-specified) daypart, referred to herein as the minimal parent. A list of C values is created and opened at first without any entries (64). The process loops through all of the input dayparts, identifying in each iteration the maximal (longest) input daypart that is still within the arbitrary daypart. The C value of the maximal input daypart is added to the list, and the maximal input daypart for this iteration is subtracted from the arbitrary daypart (66). The process then loops through selected input dayparts to find any intersections (overlaps) with the remaining arbitrary daypart. In the implementation for Arbitron input data, the selected input dayparts are M-F AM, Sat AM, Sun AM, M-F MD, Sat MD, Sun MD, M-F PM, Sat PM, Sun PM, M-F EV, Sat EV, Sun EV, and M-Su ON. If an intersection is found a C value is computed for it and added to the list. The intersection is removed from the arbitrary daypart, so any intersections are mutually exclusive (68). The C values for the intersections may be computed in various manners, preferably using a hyperbolic fit. The fit uses a hyperbola of the form $y=Ax/(Bx+C)$ that passes through the points $(x_1,y_1)$ and $(x_2,y_2)$, where $x_1$ is 1, $y_1$ is the AQH of the input daypart which is being subtracted from the arbitrary daypart, $x_2$ is the number of hours in the input daypart which is being subtracted from the arbitrary daypart, $y_2$ is the Cume of the input daypart which is being subtracted from the arbitrary daypart, A is $y_1*y_2$, B is $(x_2*y_1-x_1*y_2)/(x_2-x_1)$, and C is $x_1*y_2-Bx_1$.

A binomial method can be used to calculate C for the arbitrary daypart based on the compiled C values in the list (70). This binomial method is the same as that described below in conjunction with FIG. 5, but the C value of the minimal parent is substituted for the population, i.e., the Cume value $C_{arbitrary}$ for the arbitrary daypart is $$C_{arbitrary}=[1-\Pi_{j=1,m}(1-(C_j/C_{small}))]*C_{small}$$

where m is the number of Cume values in the list, $C_{small}$ is the Cume value of the smallest input daypart, and $C_j$ is each Cume value j in the list. The arbitrary daypart can represent a sum of component dayparts in a proposed advertising schedule.

In a simplified example, consider input dayparts which include a four-hour daypart of Monday-Sunday 6-10 a.m., and 1-hour dayparts of Monday-Sunday 6-7 a.m., Monday-Sunday 7-8 a.m., Monday-Sunday 8-9 a.m., and Monday-Sunday 9-10 a.m. The client is considering a schedule which includes the 3-hour daypart of Monday-Sunday 6-9 a.m. In this case, the minimal parent would be the four-hour daypart, and the accumulated input dayparts would be Monday-Sunday 6-7 a.m., Monday-Sunday 7-8 a.m., and Monday-Sunday 8-9 a.m. The binomial calculation would then operate on the three C values for these three input dayparts, using the C value of the four-hour daypart as the population.

Figure 5:
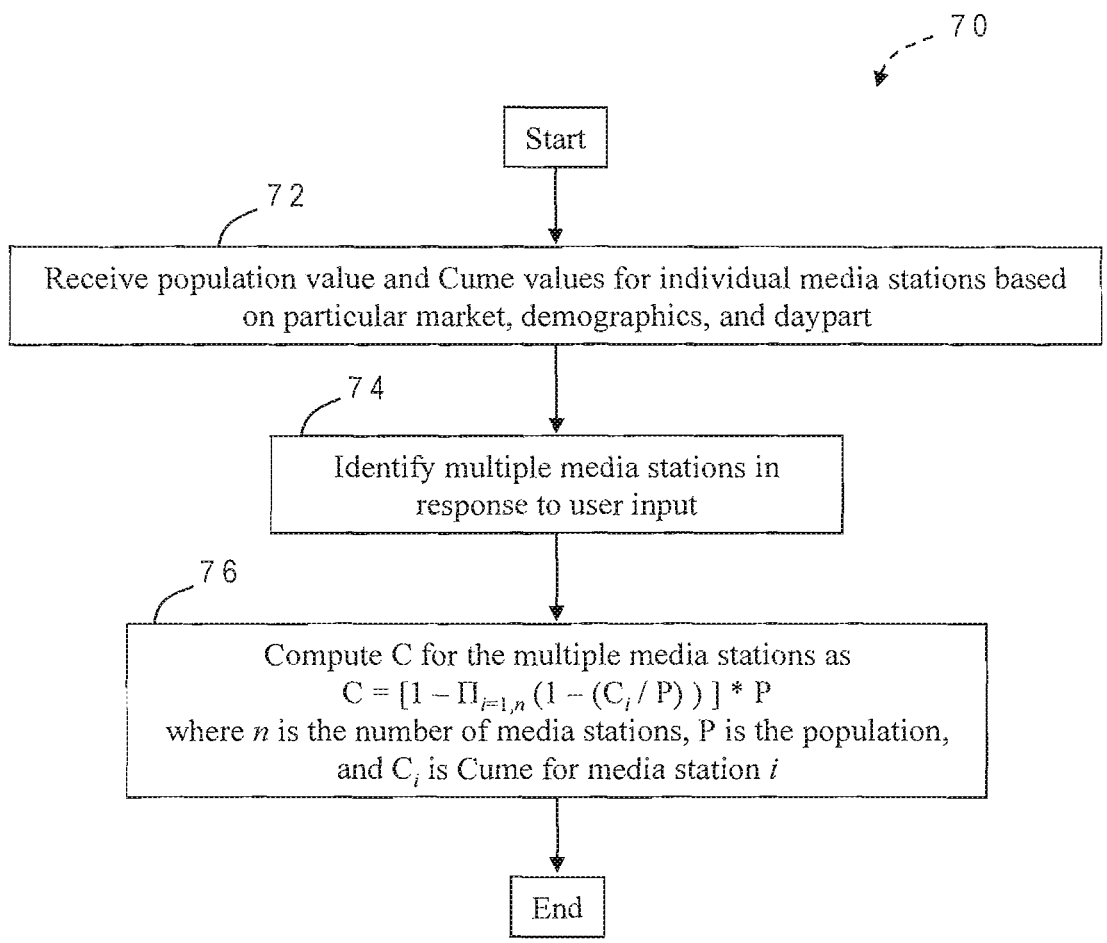
FIG. 5 is a chart illustrating the logical flow for a process of rolling up Cume values over multiple radio stations in accordance with one implementation of the present invention.

This binomial calculation is shown in further detail in the flow chart of FIG. 5, but for rolling up C values across multiple stations rather than multiple dayparts. The C values for individual stations are based on given ratings parameters, e.g., a particular geographic market, a particular demographic, and a particular daypart. The process begins when computer system 10 receives those C values and associated populations (P) for a given market over a specific demographic (72). The process then identifies a set of the multiple media stations based on user input (74). These stations have C values denoted $C_i$. The probability that a given person in the demographic is listening to the given station at a given time can be expressed as $C_i/P$. Accordingly, the probability that the person is not listening to the station at the given time is $1-(C_i/P)$. It also follows that the probability that the person is not listening to any of the stations in the market at the given time is $\Pi_{i=1,n}(1-(C_i/P))$, where n is the number of stations in the set, and that the probability that the person is listening to at least one of the identified stations in the market is $1-\Pi_{i=1,n}(1-(C_i/P))$. The final Cume for the multiple media stations as a group can thus be computed as $[1-\Pi_{i=1,n}(1-(C_i/P))]*P$ (76).

Figure 6:
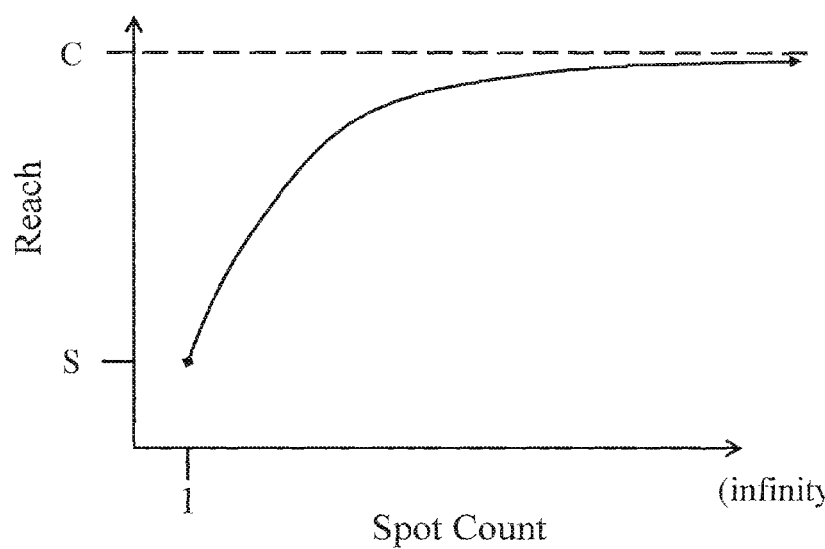
FIG. 6 is a graph illustrating an inverse exponential model for computing reach of an arbitrary radio advertising schedule in accordance with one implementation of the present invention.

As noted above, the various translated and rolled up S and C values can be used to generate a variety of outputs. One audience statistic that is very important to marketers/advertisers is reach. In some embodiments the present invention uses an inverse exponential model to compute the reach of an arbitrary radio advertising schedule, i.e., the estimated number of different people actually hearing an ad. FIG. 6 illustrates this model which can be constructed according to the formula $$Reach=n*S*C/[(n*S)+C-S],$$

where n is the number of spots in a given schedule, and S and C are the aggregate (translated and rolled up) values for the schedule. When using this formula, for just one radio advertising spot the reach is S, while for a very large number of spots the reach is C.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention is applicable to other media stations besides terrestrial radio, such as internet radio, cable or broadcast television, or satellite. It is therefore contemplated that such modifications can be made without departing from the spirit or scope of the present invention as defined in the appended claims.

What is claimed is:

1. A computer-implemented method to acquire advertising-related data, comprising:
    receiving a population value and Cume values related to individual media stations based on predetermined rating parameters of the media stations, by executing program instructions in a computer system;
    identifying a set of multiple media stations that includes two or more of the individual media stations, by executing program instructions in the computer system; and
    computing a value, C, indicating a probability that a listener is listening to at least one media station in the set of multiple media stations for the set of multiple media stations according to the formula $$C=[1-\Pi_{i=1,n}(1-(C_i/P))]*P$$

where i denotes an individual media station, $\Pi$ represents a product of a sequence of terms, n is the number of media stations in the set, P is the population value, and $C_i$ is a Cume value for each individual media station i in the set wherein Cume values for individual media stations are extended to multiple media stations, by executing program instructions in the computer system.

2. The method of claim 1 wherein:
    the predetermined rating parameters include a particular geographic market, a particular demographic, and a particular daypart; and
    the population value is the population of the particular demographic over the particular geographic market.

3. The method of claim 1 wherein the Cume values related to the individual media stations are first Cume values from a first vendor with a first set of dayparts, and further comprising repeating said receiving, identifying and computing for second Cume values from a second vendor with a second set of dayparts different from the first set of dayparts.

4. The method according to claim 1 wherein the Cume values related to the individual media stations are associated with a limited set of input dayparts, and further comprising translating the Cume values to an arbitrary daypart different from the input dayparts by:

identifying a smallest one of the input dayparts that encompasses the arbitrary daypart, by executing program instructions in a computer system;

creating a list of Cume values which include first Cume values for maximal input dayparts encompassed by the arbitrary daypart and second Cume values for intersections of the arbitrary daypart and selected input dayparts, by executing program instructions in a computer system; and computing a desired Cume value $C_{arbitrary}$ for the arbitrary daypart according to the formula $$C_{arbitrary}=[1-\Pi_{i=1,m}(1-(C_j/C_{small}))]*C_{small}$$

where j denotes an entry in the list, m is the number of Cume values in the list, $C_{small}$ is the Cume value of the smallest input daypart, and $C_j$ is a Cume value for each entry j in the list, by executing program instructions in the computer system.

5. The method of claim 4 wherein:

the input dayparts include four-hour dayparts and one-hour dayparts; and the arbitrary daypart is a three-hour daypart.

6. The method of claim 4 wherein the arbitrary daypart represents a sum of component dayparts in a proposed advertising schedule.

7. The method of claim 6, further comprising computing a reach of the proposed advertising schedule based on an inverse exponential function of spot count with a maximum reach equal to $C_{arbitrary}$ and a minimum reach equal to an average number of listeners of the multiple media stations, by executing further program instructions in the computer system.

8. A computer system comprising:

one or more processors to process program instructions;

a memory device coupled to said one or more processors; and program instructions residing in said memory device to extend Cume values of individual media stations to multiple media stations by receiving a population value and Cume values related to the individual media stations based on predetermined rating parameters, identifying a set of multiple media stations including two or more of the individual media stations, and computing a value C, indicating a probability that a listener is listening to at least one media station in the set of multiple media stations, for the set of multiple media stations according to the formula $$C=[1-\Pi_{i=1,n}(1-(C_i/P))]*P$$

where i denotes an individual media station, Π represents a product of a sequence of terms, n is the number of media stations in the set, P is the population value, and $C_j$ is each Cume value for an individual media station i in the set.

9. The computer system of claim 8 wherein:

the predetermined rating parameters include a particular geographic market, a particular demographic, and a particular daypart; and the population value is the population of the particular demographic over the particular geographic market.

10. The computer system of claim 8 wherein the Cume values related to the individual media stations are first Cume values from a first vendor with a first set of dayparts, and said program instructions are further to repeat the receiving, identifying and computing for second Cume values from a second vendor with a second set of dayparts different from the first set of dayparts.

11. The computer system of claim 8 wherein the Cume values related to the individual media stations are associated with a limited set of input dayparts, and said program instructions are further to translate the Cume values to an arbitrary daypart different from the input dayparts by:

identifying a smallest one of the input dayparts that encompasses the arbitrary daypart;

creating a list of Cume values which include first Cume values for maximal input dayparts encompassed by the arbitrary daypart and second Cume values for intersections of the arbitrary daypart and selected input dayparts; and computing a desired Cume value $C_{arbitrary}$ for the arbitrary daypart according to the formula $$C_{arbitrary}=[1-\Pi_{i=1,m}(1-(C_j/C_{small}))]*C_{small}$$

where j denotes an entry in the list, m is the number of Cume values in the list, $C_{small}$ is the Cume value of the smallest input daypart, and $C_j$ is a Cume value for each entry j in the list.

12. The computer system of claim 11 wherein:

the input dayparts include four-hour dayparts and one-hour dayparts; and the arbitrary daypart is a three-hour daypart.

13. The computer system of claim 11 wherein the arbitrary daypart represents a sum of component dayparts in a proposed advertising schedule.

14. The computer system of claim 13 wherein said program instructions are further to compute a reach of the proposed advertising schedule based on an inverse exponential function of spot count with a maximum reach equal to $C_{arbitrary}$ and a minimum reach equal to an average number of listeners of the multiple media stations.

15. A computer program product comprising:

a non-transitory computer-readable storage medium; and program instructions residing in said medium to extend Cume values of individual media stations to multiple media stations, when executed by a computer, by receiving a population value and Cume values related to the individual media stations based on predetermined rating parameters, identifying a set of multiple media stations including two or more of the individual media stations, and computing a value C, indicating a probability that a listener is listening to at least one media station in the set of multiple media stations, for the set of multiple media stations according to the formula $$C=[1-\Pi_{i=1,n}(C_i/P))]*P$$

where i denotes an individual media station, Π represents a product of a sequence of terms, n is the number of media stations in the set, P is the population value, and $C_i$ is each Cume value for an individual media station i in the set.

16. The computer program product of claim 15 wherein:

the predetermined rating parameters include a particular geographic market, a particular demographic, and a particular daypart; and the population value is the population of the particular demographic over the particular geographic market.

17. The computer program product of claim 15 wherein the Cume values related to the individual media stations are first Cume values from a first vendor with a first set of dayparts, and said program instructions, when executed, further repeat the receiving, identifying and computing for second Cume values from a second vendor with a second set of dayparts different from the first set of dayparts.

18. The computer program product of claim 15 wherein the Cume values related to the individual media stations are associated with a limited set of input dayparts, and said program instructions, when executed, further translate the Cume values to an arbitrary daypart different from the input dayparts by:

identifying a smallest one of the input dayparts that encompasses the arbitrary daypart;

creating a list of Cume values which include first Cume values for maximal input dayparts encompassed by the arbitrary daypart and second Cume values for intersections of the arbitrary daypart and selected input dayparts; and computing a desired Cume value $C_{arbitrary}$ for the arbitrary daypart according to the formula $$C_{arbitrary} = [1 - \Pi_{i=1,m}(1-(C_j/C_{small}))] * C_{small}$$

where j denotes an entry in the list, m is the number of Cume values in the list, $C_{small}$ is the Cume value of the smallest input daypart, and $C_j$ is a Cume value for each entry j in the list.

19. The computer program product of claim 18 wherein:
the input dayparts include four-hour dayparts and one-hour dayparts; and
the arbitrary daypart is a three-hour daypart.

20. The computer program product of claim 18 wherein the arbitrary daypart represents a sum of component dayparts in a proposed advertising schedule.

21. The computer program product of claim 20 wherein said program instructions, when executed, further compute a reach of the proposed advertising schedule based on an inverse exponential function of spot count with a maximum reach equal to $C_{arbitrary}$ and a minimum reach equal to an average number of listeners of the multiple media stations.

* * * * *